United States Patent
Nakatsuma et al.

(10) Patent No.: US 10,848,307 B2
(45) Date of Patent: Nov. 24, 2020

(54) RADIO TRANSMISSION DEVICE, RECEPTION DEVICE, TRANSMISSION AND RECEPTION SYSTEM, AND TRANSMISSION AND RECEPTION METHOD

(71) Applicant: MITSUBISHI ELECTRIC CORPORATION, Tokyo (JP)

(72) Inventors: Saki Nakatsuma, Tokyo (JP); Kazuhiko Yamada, Tokyo (JP); Masao Noguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 201 days.

(21) Appl. No.: 15/748,906

(22) PCT Filed: Jul. 7, 2016

(86) PCT No.: PCT/JP2016/070061
§ 371 (c)(1),
(2) Date: Jan. 30, 2018

(87) PCT Pub. No.: WO2017/051588
PCT Pub. Date: Mar. 30, 2017

(65) Prior Publication Data
US 2019/0013944 A1    Jan. 10, 2019

(30) Foreign Application Priority Data

Sep. 25, 2015 (JP) .................... 2015-187875

(51) Int. Cl.
*H04L 29/06* (2006.01)
*H04L 9/16* (2006.01)
(Continued)

(52) U.S. Cl.
CPC .............. *H04L 9/16* (2013.01); *H04B 17/318* (2015.01); *H04L 9/0816* (2013.01);
(Continued)

(58) Field of Classification Search
CPC ..... H04L 9/16; H04L 9/0816; H04L 63/0414; H04B 17/318; H04W 12/04
See application file for complete search history.

(56) References Cited

U.S. PATENT DOCUMENTS 5,682,134 A * 10/1997 Stallbohm ........... B60R 25/1009
340/426.27
2003/0061479 A1* 3/2003 Kimura ................... H04L 63/06
713/153

(Continued)

FOREIGN PATENT DOCUMENTS

| JP | 2012-010193 A | 1/2012 |
| JP | 2015-162162 A | 9/2015 |
| WO | WO 2014/097968 A1 | 6/2014 |

*Primary Examiner* — Alexander Lagor
*Assistant Examiner* — Rodman Alexander Mahmoudi
(74) *Attorney, Agent, or Firm* — Birch, Stewart, Kolasch & Birch, LLP

(57) ABSTRACT

A radio transmission device includes: an information acquisition unit to externally acquire information data; an encryptor to encrypt the information data using one of a plurality of encryption processes used for encryption to generate transmission data; a radio field intensity setter having a different setting for each of the plurality of encryption processes used for encryption, the radio field intensity setter setting a radio field intensity at which the transmission data is to be transmitted; and a transmitter to transmit the transmission data at the set radio field intensity.

20 Claims, 9 Drawing Sheets

(51) Int. Cl.

| | |
|---|---|
| *H04L 9/08* | (2006.01) |
| *H04W 12/00* | (2009.01) |
| *H04B 17/318* | (2015.01) |
| *H04W 12/04* | (2009.01) |
| *H04W 4/80* | (2018.01) |
| *H04W 84/18* | (2009.01) |

(52) U.S. Cl.
CPC .......... *H04L 9/0866* (2013.01); *H04L 9/0894* (2013.01); *H04L 63/0414* (2013.01); *H04W 12/001* (2019.01); *H04W 12/04* (2013.01); *H04L 63/0435* (2013.01); *H04L 2209/80* (2013.01); *H04W 4/80* (2018.02); *H04W 84/18* (2013.01)

(56) References Cited

U.S. PATENT DOCUMENTS

| | | | |
|---|---|---|---|
| 2006/0200855 A1* | 9/2006 | Willis | H04L 9/3213 726/2 |
| 2009/0154596 A1* | 6/2009 | Trachewsky | H03G 3/3047 375/297 |
| 2010/0312549 A1* | 12/2010 | Akuwudike | G06F 17/276 704/9 |
| 2011/0320492 A1* | 12/2011 | Inghelbrecht | G06Q 40/08 707/776 |
| 2013/0057591 A1* | 3/2013 | Sugiyama | H04W 48/20 345/671 |
| 2015/0312725 A1 | 10/2015 | Torii | |
| 2017/0331837 A1* | 11/2017 | Moon | H04L 1/00 |

\* cited by examiner

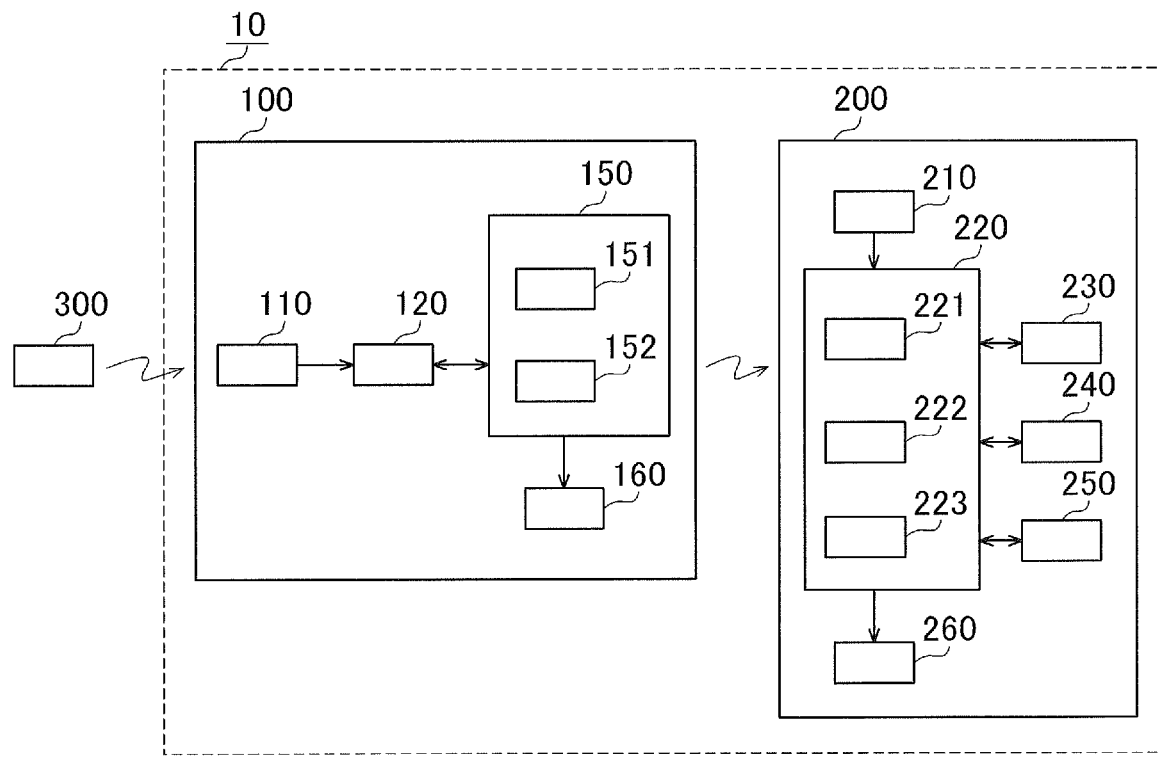

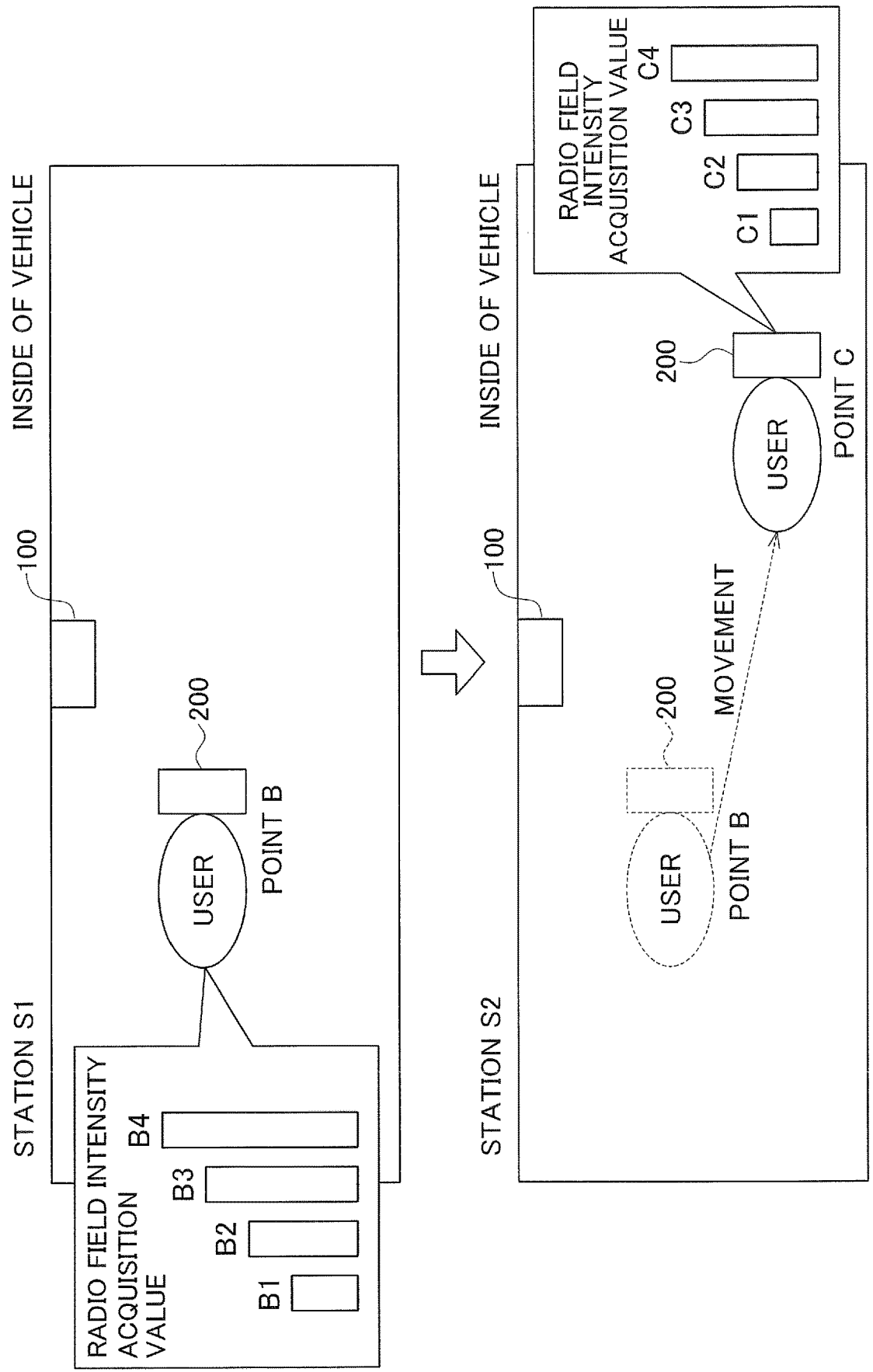

FIG. 8A
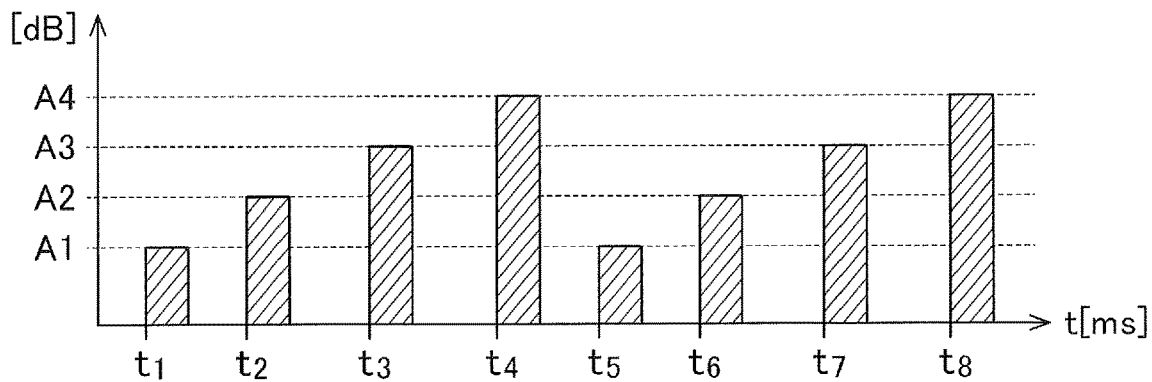
FIG. 8B
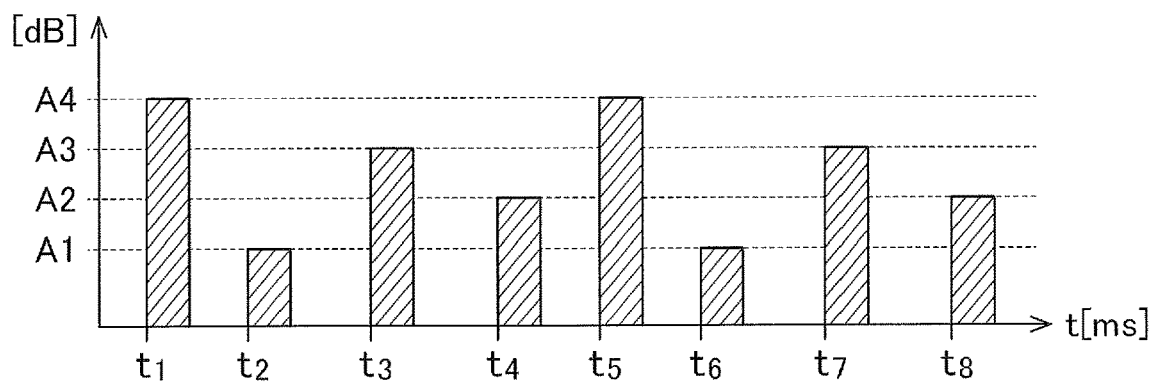
FIG. 9
| CHANGE PATTERN | RADIO FIELD INTENSITY OUTPUT VALUE | | | ENCRYPTION PROCESS |
|---|---|---|---|---|
| 1 | A1[dB] | A2[dB] | A3[dB] | ENCRYPTION PROCESS 1 |
| 2 | A1[dB] | A3[dB] | A2[dB] | ENCRYPTION PROCESS 2 |
| 3 | A2[dB] | A1[dB] | A4[dB] | ENCRYPTION PROCESS 3 |
| 4 | A2[dB] | A3[dB] | A1[dB] | ENCRYPTION PROCESS 4 |
| 5 | A3[dB] | A1[dB] | A2[dB] | ENCRYPTION PROCESS 5 |
| 6 | A3[dB] | A2[dB] | A1[dB] | ENCRYPTION PROCESS 6 |

| FIRST IDENTIFI-CATION ID | SECOND IDENTIFI-CATION ID | THIRD IDENTIFI-CATION ID | FOURTH IDENTIFI-CATION ID | CONTENT IDENTIFI-CATION ID |
|---|---|---|---|---|
| ID1_1 | ID2_1 | ID3_1 | ID4_1 | ⇒ 00 |
| ID1_2 | ID2_2 | ID3_2 | ID4_2 | ⇒ 01 |
| ID1_3 | ID2_3 | ID3_3 | ID4_3 | ⇒ 02 |
| ... | ... | ... | ... | ... |
| ID1_m | ID2_m | ID3_m | ID4_m | ⇒ pq |

Rows labeled 1c, 2c, 3c, ..., mc on the left; 1d, 2d, 3d, ..., md on the right.

RADIO TRANSMISSION DEVICE, RECEPTION DEVICE, TRANSMISSION AND RECEPTION SYSTEM, AND TRANSMISSION AND RECEPTION METHOD

TECHNICAL FIELD

The present invention relates to a radio transmission device and a reception device using a short-range wireless communication technology.

BACKGROUND ART

There is a conventionally known technique that acquires position information of a user carrying a mobile information terminal by using short-range wireless communication, such as Bluetooth Low Energy (which may be referred to below simply as BLE), in an underground mall or building in which it is difficult to acquire position information of a user by using the Global Positioning System (which may be referred to below simply as GPS), or in a small area, such as a facility.

As such a system using position information of a user, there is disclosed a system that acquires position information of a user in a small area, such as a shop, and provides a mobile information terminal carried by the user with content corresponding to the position of the user in such a manner as to provide the user with a coupon when the user is inside the shop and shop information when the user is outside the shop. In this system, a radio transmission device broadcasts transmission data including an encrypted identification ID obtained by encrypting an identification ID unique to the radio transmission device, information on a process in the encryption, and the like; and the mobile information terminal performs control for changing content on the basis of difference in radio field intensity measured when the transmission data is received (see, for example, Patent Literature 1).

CITATION LIST

Patent Literature

Patent Literature 1: WO2014/097968

SUMMARY OF INVENTION

Technical Problem

However, in the case of installing a radio transmission device in a vehicle, such as a train, broadcasting various information items, such as the position or running state of the train, and displaying an operation guide (or operation information) on a mobile information terminal used as a reception device, or in other cases, it is necessary to further include information regarding the vehicle in the transmission data. Also, since a passenger often stays at a certain position in a vehicle, no large difference occurs in radio field intensity measured by the mobile information terminal in many cases. Thus, in information transmission taking advantage of difference in intensity of the radio wave received by the mobile information terminal like the conventional technique, there is a problem in that it is difficult to transmit information regarding an encryption process while reserving a data area necessary for including information regarding the vehicle.

The present invention has been made to solve such a problem, and is intended to provide transmission data and information regarding an encryption process without compressing a data area of the transmission data transmitted by a radio transmission device due to the information regarding the encryption process.

Solution to Problem

A radio transmission device according to the present invention includes: an information acquisition unit to externally acquire information data; an encryptor to encrypt the information data using one of a plurality of encryption processes used for encryption to generate transmission data; a radio field intensity setter having a different setting for each of the plurality of encryption processes used for encryption, the radio field intensity setter setting a radio field intensity at which the transmission data is to be transmitted; and a transmitter to transmit the transmission data at the set radio field intensity.

Advantageous Effects of Invention

According to the present invention, since information regarding an encryption process is transmitted in association with a setting of a radio field intensity at which transmission data is transmitted, it is possible to provide the transmission data and the information regarding the encryption process without compressing a data area of the transmission data transmitted by a radio transmission device due to the information regarding the encryption process.

BRIEF DESCRIPTION OF DRAWINGS

FIG. 1 is a block diagram schematically illustrating a configuration of a transmission and reception system according to a first embodiment of the present invention.

FIG. 2 is a schematic diagram illustrating a table indicating common keys stored in the transmission and reception system according to the first embodiment of the present invention.

FIG. 3 is an example of a content information table of the transmission and reception system according to the first embodiment of the present invention.

FIG. 7 is a diagram schematically illustrating the difference between radio field intensity measurement values in the transmission and reception system according to the first embodiment of the present invention.

FIGS. 8A and 8B are diagrams illustrating modifications of a change pattern of a radio field intensity in the first embodiment of the present invention.

FIG. 9 is a diagram illustrating correspondence between change patterns of a radio field intensity and encryption processes in the first embodiment of the present invention.

DESCRIPTION OF EMBODIMENTS

First Embodiment

Figure 4:
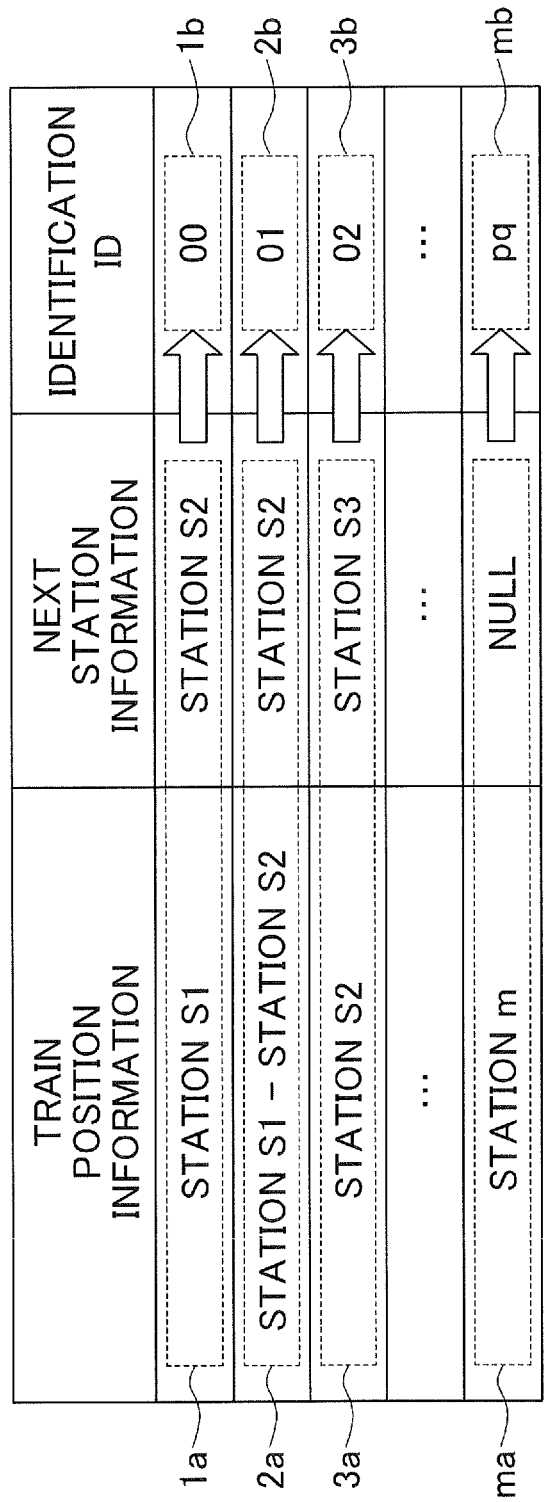
FIG. 4 is a schematic diagram of an identification ID generation process table of a radio transmission device according to the first embodiment of the present invention.

Embodiments of the present invention will now be described with reference to the drawings. In the following description of the drawings, the same or similar parts are given the same or similar reference characters. It should be noted that the drawings are schematic and ratios between dimensions or the like may differ from reality. Thus, specific dimensions or the like should be determined with reference to the following description. The relationship or ratio between the dimensions of parts may differ among the drawings.

FIG. 1 is a block diagram schematically illustrating a configuration of a transmission and reception system according to a first embodiment of the present invention. This embodiment describes a situation where a radio transmission device 100 is placed in a train and a passenger in the train carries a mobile information terminal 200 as a reception device. In FIG. 1, the transmission and reception system 10 includes the radio transmission device 100, which is placed in the vehicle and broadcasts transmission data, and the mobile information terminal 200, which receives the transmission data broadcast from the radio transmission device 100 and displays an operation guide (or operation information) of the vehicle. Specifically, the mobile information terminal 200, which has received the transmission data transmitted from the radio transmission device 100 placed in a vehicle of the train, displays information regarding the operational status of the train, such as information indicating the destination or the like of the train, on a display of the mobile information terminal 200.

Here, broadcasting indicates transmission to a group, the destination of the transmission not being limited to a single reception device. In this embodiment, it indicates transmission to a group consisting of mobile information terminals 200 located within a receivable area of the radio transmission device 100. When the number of passengers carrying mobile information terminals 200 in the train is one, the group includes the single mobile information terminal 200.

The configuration of the radio transmission device 100 will be described first. The radio transmission device 100 includes an information acquisition unit 110, an identification ID generator 120, a controller 150, and a transmitter 160. The controller 150 includes a radio field intensity setter 151 and an encryptor 152.

When the radio transmission device 100 is placed in a predetermined vehicle, such as a train, it is connected to an information transmitter 300 that transmits train information, in a wired or wireless manner. The information transmitter 300 is placed in the vehicle as with the radio transmission device 100, and transmits information regarding the train to the information acquisition unit 110 of the radio transmission device 100 at predetermined time intervals. The train information described here includes, for example, a train type information item indicating the train type (local, express, limited express, or the like), a starting station information item indicating the starting station, a terminal station information item indicating the terminal station, a next station information item indicating the next station that is the next stop of the train, and a train position information item indicating the position of the train.

Each time the information acquisition unit 110 acquires train information transmitted from the information transmitter 300, the information acquisition unit 110 sends the acquired train information to the identification ID generator 120.

The identification ID generator 120 acquires train information from the information acquisition unit 110, and generates and stores an identification ID on the basis of the train information. The identification ID generator 120 previously stores a correspondence relationship between various items of train information and identification IDs, and generates the identification ID on the basis of the correspondence relationship. The identification ID generated here is a unique number without duplication, and is used to determine an operation guide (or operation information) to be displayed on the mobile information terminal 200. Each time the information acquisition unit 110 acquires train information, the information acquisition unit 110 sends it to the identification ID generator 120, and the identification ID generator 120 generates an identification ID on the basis of the acquired train information and performs update. Also, upon request from the controller 150, the identification ID generator 120 sends the identification ID stored at the time of the request, to the controller 150.

The controller 150 sets the radio field intensity at which broadcasting to the mobile information terminal 200 is to be performed by the radio transmission device 100, and generates transmission data including data obtained by encrypting the identification ID acquired from the identification ID generator 120. It then sends the generated transmission data to the transmitter 160.

The transmission data is generated at predetermined time intervals. For this purpose, in the controller 150, the times at which the transmission data generation process is performed is previously set by the controller 150; in the first embodiment of the present invention, the time intervals at which the transmission data generation process is performed are regular intervals and determined to be 100 ms. When the radio transmission device 100 is powered on, the controller 150 starts time measurement and performs the transmission data generation process at specified times.

In the controller 150, settings of the radio field intensity and encryption processes for the identification ID are associated with each other, and each time transmission data is generated, the controller 150 changes the setting of the radio field intensity and the encryption process for the identification ID. The controller 150 stores a counter value used for associating the setting of a radio field intensity output value and the encryption process for the identification ID, and upon request from the radio field intensity setter 151 and encryptor 152, sends it to them. The counter value is an integer having an initial value of 1; in the first embodiment of the present invention, in order to change the radio field intensity in four stages, the counter value ranges from 1 to 4. When the process by the encryptor 152 finishes, the counter value is incremented. It is not mandatory that the radio field intensity be changed in four stages, and the number of stages may be five, six, or more.

The radio field intensity setter 151 sets the radio field intensity at which the radio transmission device 100 is to perform broadcasting to the mobile information terminal 200. The value of the set radio field intensity will be referred to as the radio field intensity output value. The radio field intensity setter 151 changes the radio field intensity output value each time transmission data is generated.

In the radio field intensity setter 151, a correspondence relationship between the counter value and the radio field intensity output value is previously defined so that the radio field intensity output value increases by one step each time the counter value increases, and the radio field intensity output value is set according to the definition. When it is assumed that the radio field intensity output value changes in four stages and the radio field intensity output value is set to, for example, A1 dB, A2 dB, A3 dB, and A4 dB, which are arranged in ascending order, the relationship between these radio field intensity output values is represented by A1<A2<A3<A4. Although the number of stages is four in this example, it is not limited to four and may be five, six, or more.

The encryptor 152 encrypts an identification ID acquired from the identification ID generator 120. It then sends the encrypted identification ID as transmission data to the transmitter 160.

In the encryptor 152, a correspondence relationship between the counter value and the encryption arithmetic process is required to be previously defined. For example, when date information, including today's year (the last two digits), month, date, and day of the week, is used for the encryption process, the correspondence relationship between the counter value and the encryption arithmetic process is defined as follows. When the train boarding date is Friday, May 15, 2015, "15", which is the last two digits of the year "2015", is used for the arithmetic process when the counter value is 1, "05", which indicates the month in two digits, is used for the arithmetic process when the counter value is 2, and so on. As the correspondence relationship between the counter value and the encryption process defined in the encryptor 152, a correspondence relationship between the counter value and a function used in the encryption process may be defined.

Upon completion of the encryption process, the counter value is incremented. When the counter value becomes 5 due to the incrementing, the counter value is initialized to 1.

As described above, using the counter value, the correspondence relationship between the counter value and the radio field intensity output value set by the radio field intensity setter 151 is previously defined, and the correspondence relationship between the counter value and the encryption arithmetic process set by the encryptor 152 is previously defined. This indicates that the setting of the radio field intensity setter 151 and the encryption arithmetic process set by the encryptor 152 are associated with each other.

The transmitter 160 acquires transmission data from the encryptor 152 and performs broadcasting using short-range wireless communication. The standard of the short-range wireless communication is, for example, BLE that is Bluetooth 4.0. BLE uses a 2.4 GHz band and has a relatively short communication range of 2.5 m to 50 m. Data that is broadcast using BLE is transmitted and received using a universally unique identifier (UUID) (128-bit length), a Major (16-bit length), or a Minor (16-bit length). In many cases, the UUID is a unique value set for each radio, transmission device; the Major and Minor can serve as a data area in which an arbitrary value can be set. In the first embodiment of the present invention, when transmission data is broadcast according to the BLE standard, an area of the Major or Minor is used, and an area of the UUID may also be used in some cases. Further, the BLE standard specifies that the transmission intervals are from 20 ms to 10.24 s. Since the data generation intervals in the controller 150 are 100 ms, the intervals of broadcasting by the radio transmission device 100 are also 100 ms.

The configuration of the mobile information terminal 200, which is a reception device, will now be described. The mobile information terminal 200 includes a radio receiver 210, a terminal controller 220, a radio field intensity memory 230, a common key memory 240, a content information manager 250, and a display unit 260. The terminal controller 220 includes a radio field intensity measurer (also referred to as a radio field intensity acquisition unit) 221, a decryptor 222, and a content information acquisition unit 223.

The radio receiver 210 receives transmission data broadcast by the radio transmission device 100 and sends the transmission data to the terminal controller 220. The radio receiver 210 performs the reception according to the Bluetooth (registered trademark) standard. The mobile information terminal 200, including the radio receiver 210, is capable of short-range wireless communication, and specifically, may be a smartphone, a tablet terminal, or the like.

When the user carrying the mobile information terminal 200 boards the vehicle in which the radio transmission device 100 is placed, the radio receiver 210 of the mobile information terminal 200 starts reception of transmission data broadcast from the transmitter 160.

When the radio receiver 210 receives transmission data, the terminal controller 220 in the mobile information terminal 200 extracts the identification ID from the transmission data in order to determine content to be displayed on the display unit 260. The terminal controller 220 measures, in the radio field intensity measurer 221, the radio field intensity at the time of the reception by the radio receiver 210, and the decryptor 222 decrypts the transmission data. By using the identification ID, which is extracted by the decryptor 222 after the decryption, the content information acquisition unit 223 acquires a content information item regarding an operation guide (or operation information) of the train from the content information manager 250 and sends it to the display unit 260.

In the radio transmission device 100, the radio field intensity output value and the encryption process for the identification ID are associated with each other, and the radio transmission device 100 changes the encryption process of the identification ID according to the radio field intensity output value. Thus, in order for the mobile information terminal 200 to decrypt the transmission data, it is necessary to identify the applied encryption process by measuring the radio field intensity.

The radio field intensity measurer 221 measures the radio field intensity at which the radio receiver 210 receives the transmission data. Then, it refers to information regarding the radio field intensity previously stored in the radio field intensity memory 230. The radio field intensity memory 230 stores multiple radio field intensity values, which are referred to here as radio field intensity storage values, represented in stages. It is determined which of the radio field intensity storage values corresponds to the radio field intensity value, which is referred to here as the radio field intensity measurement value, measured by the radio field intensity measurer 221. For example, suppose that multiple radio field intensity storage values B1 dB, B2 dB, B3 dB, and B4 dB (B1<B2<B3<B4) are stored in the radio field intensity memory 230 in ascending order in a stepwise manner. In this case, when the radio field intensity measurement value indicates a value near or closest to B1 dB, since B1 dB is the intensity at the first stage among the radio field intensity storage values, "1" is obtained as radio field intensity information. This radio field intensity information is used to determine a common key used for decryption of the transmission data.

In some cases, the radio field intensity memory 230 stores the radio field intensity measurement value, which is the radio field intensity measured by the radio field intensity measurer 221. The radio field intensity measurement value is stored in the case where the radio field intensity measurement value matches none of the radio field intensity storage values previously stored in the radio field intensity memory 230, in the case where the radio field intensity measurement value is outside predetermined ranges from the radio field intensity storage values, and in the case where the measurement order of radio field intensity measurement values has changed. Here, the case where the measurement order of radio field intensity measurement values has changed refers to the case where, in the situation where radio field intensity measurement values B1 dB, B2 dB, B3 dB, and B4 dB have been measured in this order, at a certain time, after a radio field intensity measurement value of B1 dB has been measured, a radio field intensity measurement value of B3 dB is measured instead of a radio field intensity measurement value of B2 dB, or other similar cases.

Also, at this time, when four radio field intensity storage values have already been stored in the radio field intensity memory 230, all the stored radio field intensity storage values are deleted, and then radio field intensity measurement values are newly stored in the radio field intensity memory 230. For example, in the situation where radio field intensity storage values B1 dB, B2 dB, B3 dB, and B4 dB are stored in the radio field intensity memory 230, if C1 dB is measured as the radio field intensity measurement value, all the radio field intensity storage values B1 to B4 are deleted. Here, the number of radio field intensity storage values stored in the radio field intensity memory 230 corresponds to the number of stages of the radio field intensity output value output by the radio transmission device 100.

The radio field intensity memory 230 stores a radio field intensity measurement value. A condition for storing a radio field intensity measurement value is that the radio field intensity measurement value is different from the radio field intensity storage values. However, for example, when the intensities of radio field intensity measurement values that can be measured changes (e.g., from B1 dB, B2 dB, B3 dB, and B4 dB to C1 dB, C2 dB, C3 dB, and C4 dB) due to movement of the passenger, unless all the radio field intensity storage values B1 to B4 are deleted, eight radio field intensity storage values exist, and radio field intensity information cannot be acquired appropriately.

The common key memory 240 stores common keys used for decryption of transmission data. The stored common keys are previously acquired outside the train by network connection to a server having the common keys, or by other methods. FIG. 2 is a schematic diagram illustrating a table indicating common keys stored in the common key memory. For example, when the encryptor 152 uses date information in encrypting the identification ID, the common key memory 240 stores common key information items based on the current year, month, date, and day of the week. For example, here, common key information items corresponding to KEY 1, KEY 2, KEY 3, and KEY 4 correspond to the current year, month, date, and day of the week. The common key information items are not limited to information items based on date information, and may be information items based on time information, location information, or the like, or may be other information items, such as information items that vary based on a predetermined rule.

The common key memory 240 infers the common key that has been used in the encryption, on the basis of the radio field intensity information, and sends a common key information item that is determined from the inference, to the decryptor 222. For example, when the radio field intensity information is 1, the common key memory 240 infers that the used common key is KEY 1, and sends the common key information item corresponding to KEY 1 to the decryptor 222.

The decryptor 222 acquires the common key from the common key memory 240 and decrypts the transmission data, thereby extracting the identification ID. In the decryptor 222, the decryption arithmetic process is previously defined.

The content information acquisition unit 223 uses the identification ID acquired from the decryptor 222 to acquire a content information item, which is information regarding content to be displayed by the display unit 260, from the content information manager 250, and sends it to the display unit 260.

The content information manager 250 stores content information items to be displayed by the display unit 260.

FIG. 3 is an example of a content information table indicating correspondence between the identification IDs and the content information items. FIG. 4 is a schematic diagram of an identification ID generation process table in the radio transmission device. The content information manager 250 previously holds information represented by the identification ID generation process table, and sends the content information item corresponding to the identification ID acquired from the content information acquisition unit 223, to the content information acquisition unit 223. Here, the content information items are data including text, images, or the like.

The display unit 260 displays text, an image, or the like on a display of the mobile information terminal 200, on the basis of the content information item acquired from the content information acquisition unit 223. For example, it displays an operation guide, such as information on the current position, destination, or delay of the train, on the display of the mobile information terminal 200.

The operation of the transmission and reception system according to this embodiment will now be described. Of the operations of the radio transmission device 100, generation of the identification ID will be described first. For example, in the case where the identification ID generator 120 generates the identification ID from a train position information item and a next station information item, when the train, which the passenger is riding, is stopped at station S1, the information acquisition unit 110 acquires, from the information transmitter 300, train information including "station S1" as the train position information item and "station S2" as the next station information item, and sends it to the identification ID generator 120.

FIG. 4 is an example of the identification ID generation process table, which indicates a correspondence relationship between train position information items and next station information items and the identification IDs. In FIG. 4, the unique identification IDs 1b to mb are defined with respect to information items a to ma, respectively. For example, when the train position information item is "station S1" and the next station information item is "station S2", the identification ID to be generated is "00". When the train has arrived at station S2, the train position information item is "station S2" and the next station information item is "station S3", and thus the identification ID to be generated is "02". Although in this example, the identification ID is determined from the train position information item and next station information item, the identification ID may be determined from a train type information item, a starting station information item, a terminal station information item, or the like.

Figure 5:
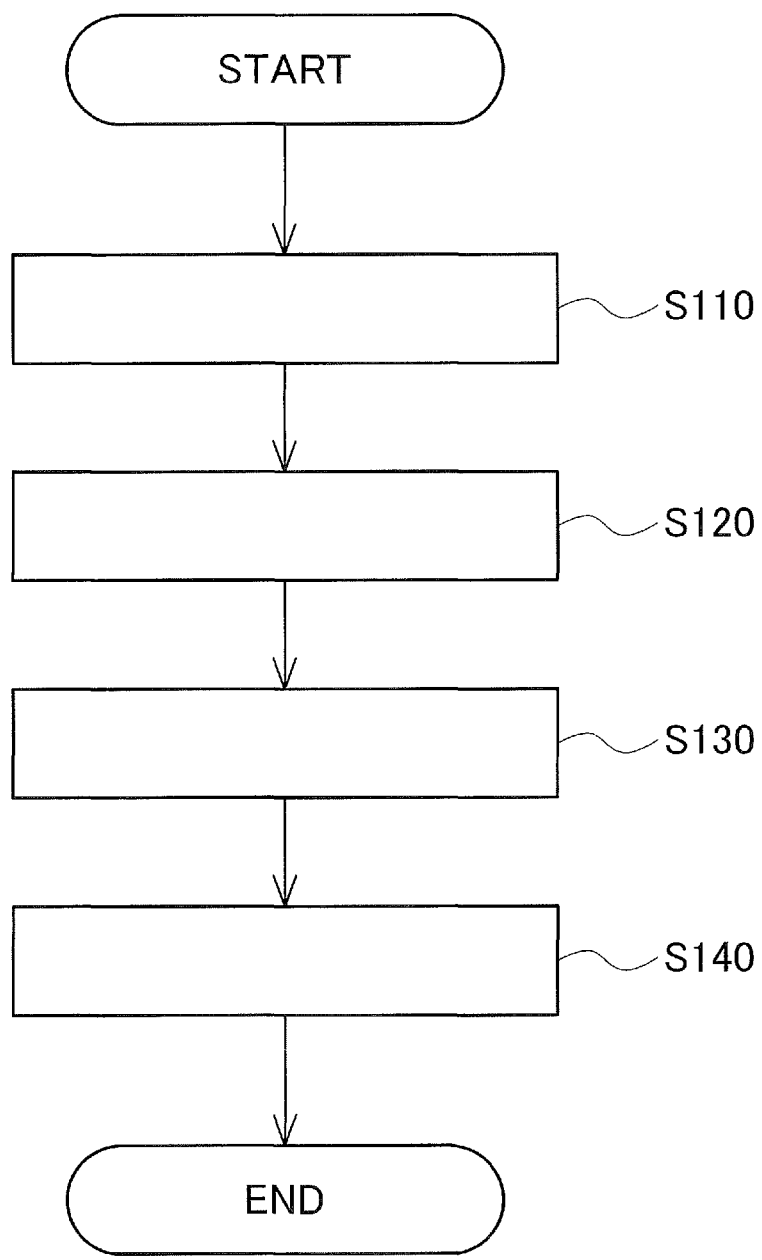
FIG. 5 is a flowchart illustrating the procedure of a process of generating transmission data in the radio transmission device according to the first embodiment of the present invention.

In the transmission and reception system 10, in order to inform the mobile information terminal 200 of the generated identification ID, the controller 150 generates transmission data. The transmission data generation process will be described. FIG. 5 is a flowchart illustrating the procedure of the transmission data generation process by the controller of the radio transmission device of the transmission and reception system.

In a first step, the radio transmission device 100 generates transmission data every 100 ms. When the time comes to generate transmission data, the controller 150 first sets the radio field intensity output value in the radio field intensity setter 151 in step S110. In this embodiment, the counter value ranges from 1 to 4, and the radio field intensity is set according to the value. For example, in step S110, when the counter value of the controller 150 is 1, the radio field intensity output value is set to A1 dB. When the counter value is 2, the radio field intensity output value is set to A2 dB; when the counter value is 3, the radio field intensity output value is set to A3 dB; when the counter value is 4, the radio field intensity output value is set to A4 dB. Here, the radio field intensity output values A1 to A4 satisfy A1<A2<A3<A4.

After the radio field intensity output value is set, in step S120, the encryptor 152 acquires the identification ID from the identification ID generator 120. For example, the identification ID generator 120 stores, as the identification ID, "00" when the train, which the passenger is riding, is stopped at station S1, "01" when the train is running between station S1 and station S2, and "02" when the train arrives and is stopped at station S2; the acquired identification ID changes when the running status of the train changes.

After the encryptor 152 acquires the identification ID, in step S130, it performs the encryption arithmetic process corresponding to the counter value. For example, it performs a first arithmetic process when the counter value is "1" and a second arithmetic process when the counter value is "2".

After the encryption arithmetic process, in step S140, the encryptor 152 increments the counter value to update the counter value of the controller 150. At this time, since the counter value ranges from 1 to 4, when the counter value becomes "5" after the increment, the counter value is reset to its initial value "1".

Figure 6:
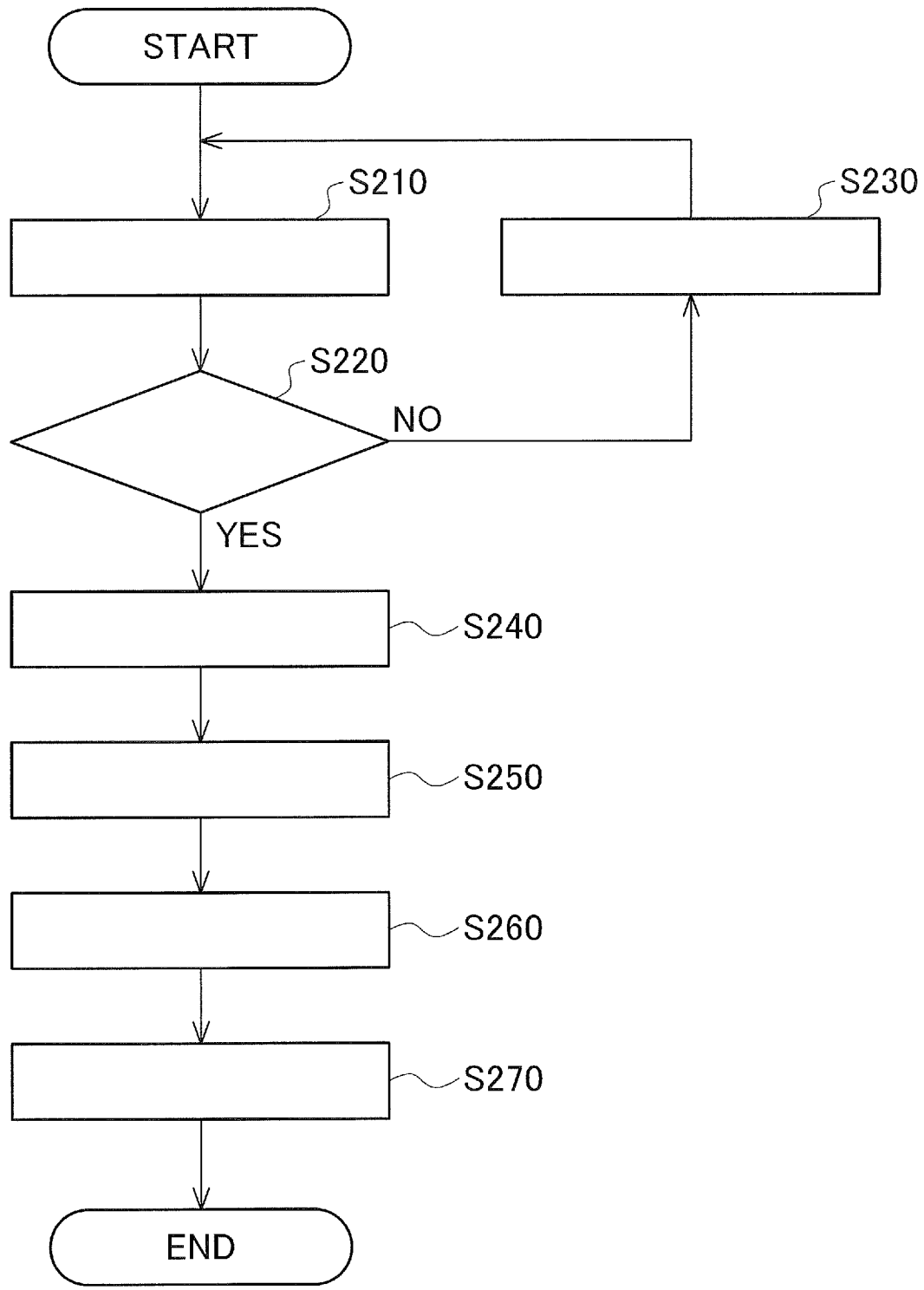
FIG. 6 is a flowchart illustrating the procedure of a content information acquisition process in a mobile information terminal according to the first embodiment of the present invention.

Next, a content execution process in the mobile information terminal 200 will be described. FIG. 6 is a flowchart illustrating the procedure of a content information acquisition process in the controller of the mobile information terminal of the transmission and reception system.

In a second step, the user carrying the mobile information terminal 200 establishes a network connection to a server having common keys required for decryption of transmission data, acquires the common keys, and stores them in the common key memory 240 in advance, for example, before boarding the train. In such a state, when the user carrying the mobile information terminal 200 boards the vehicle in which the radio transmission device 100 is placed, in step S210, the radio receiver 210 of the mobile information terminal 200 starts to receive transmission data broadcast from the radio transmission device 100 every 100 ms, and the radio field intensity measurer 221 performs radio field intensity measurement.

Next, in step S220, it is determined whether four radio field intensity measurement values that can be measured at the position where the passenger exists have been stored in the radio field intensity memory 230. When the radio field intensity measurement value measured in step S210 matches none of the previously stored four radio field intensity storage values, or when it differs from the radio field intensity measurement value expected from the measurement order, it is determined that necessary four radio field intensity measurement values have not been stored, and storage of the radio field intensity measurement value is carried out.

Four radio field intensity measurement values (e.g., B1 dB, B2 dB, B3 dB, and B4 dB) that can be measured are different from each other, and thus when it matches one of them, it is determined that four radio field intensity measurement values have been stored. However, since radio field intensity measurement values may overlap depending on the position, the case where the intensities of the measurable radio field intensity measurement values change due to movement of the passenger, for example, from B1 dB, B2 dB, B3 dB, and B4 dB to C1 dB, C2 dB, C3 dB, and C4 dB is considered.

FIG. 7 is a diagram schematically illustrating the difference between the radio field intensity measurement values at two points in the vehicle. For example, suppose that the passenger carrying the mobile information terminal 200 boards the train from station S1 and stays at point B in the vehicle until reaching station S2. When the passenger has just boarded the train, the radio field intensity memory 230 stores nothing, and the mobile information terminal 200 stores radio field intensity measurement values measured at point B in the radio field intensity memory 230. The radio transmission device 100 in the vehicle changes the output radio field intensity output value each time transmission data is broadcast, the radio field intensity output value being changed in four stages. According to the change, the radio field intensity measurement value measured at point B when transmission data is received is one of B1 dB, B2 dB, B3 dB, and B4 dB, which are arranged in ascending order. When the radio field intensity memory 230 stores nothing, the mobile information terminal 200 repeats steps S210 to S230, thereby storing radio field intensity measurement values B1 dB, B2 dB, B3 dB, and B4 dB in the radio field intensity memory 230 as radio field intensity storage values.

If the passenger moves from point B to point C in the vehicle, the distance from the radio transmission device 100 changes, and accordingly the measurable radio field intensity measurement values change, and thus they need to be stored in the radio field intensity memory 230 again. If the user moves from point B to point C in the vehicle after the train arrives at station S2, the radio field intensity measurement value measured at point C is one of C1 dB, C2 dB, C3 dB, and C4 dB, which are arranged in ascending order, and none of them matches any of the radio field intensity storage values stored in the radio field intensity memory 230 at point B. Thus, in step S220, it is determined that the radio field intensity measurement values that can be measured at point C have not been stored. After that, in step S230, all the radio field intensity storage values stored in the radio field intensity memory 230 are deleted, and the radio field intensity measurement values C1 dB, C2 dB, C3 dB, and C4 dB measured at point C are stored in the radio field intensity memory 230. It has been assumed that the radio field intensity measurement values measured at point C do not match those measured at point B. However, if some of the radio field intensity measurement values measured at point C match ones of the radio field intensity measurement values measured at point B, it is determined whether to store the radio field intensity measurement values again, in view of the measurement order of the radio field intensity measurement values.

In step S240, when four radio field intensity storage values have been stored in the radio field intensity memory 230, radio field intensity information is obtained. For example, if the passenger, who is the user, stays at point C in the vehicle from station S2, the radio field intensity storage values are C1 dB, C2 dB, C3 dB, and C4 dB; in step S210, for example, if a radio field intensity measurement value measured at point C is C1 dB, since it is the first-stage value of the radio field intensity storage values, the radio field intensity information is "1".

Obtaining the radio field intensity information makes it possible to determine the common key to be used for decryption. In step S250, the decryptor 222 determines the common key according to the radio field intensity information obtained in step S240, and in step S260, performs the decryption arithmetic process to extract the identification ID. The common key memory 240 stores the common keys in the form illustrated by the table of FIG. 2, and thus when the obtained radio field intensity information is "1", the corresponding common key "KEY 1" is used for the decryption.

Next, in step S270, the content information acquisition unit 223 acquires a content information item from the content information manager 250 on the basis of the extracted identification ID. For example, when the train is stopped at station S2, according to FIG. 4, the identification ID generated in the radio transmission device 100 is "02", and the mobile information terminal 200 acquires this identification ID by decrypting the transmission data. According to the table illustrated in FIG. 4, the identification ID is "02", and according to the table illustrated in FIG. 3, the content information item "Info_Con _02" corresponding to "02" is acquired. In this example, "Info_Con _02" is information provided when the train is stopped at station S2.

The display unit 260 of the mobile information terminal 200 acquires the content information item and thereby displays an operation guide of the train. At this time, the display by the display unit 260 changes depending on the operational status of the train. For example, when the train leaves from station S2 and is running toward station S3 (changes from a stop state to a running state), the display by the display unit 260 changes from "Stopped at station S2" to "Running; the next stop will be station S3".

As described above, the transmission and reception system according to the first embodiment of the present invention makes it possible to transmit various train information items to the mobile information terminal and provide a detailed operation guide of the train. To provide an operation guide of the train in real time, it is necessary to efficiently transmit multiple information items, such as train type information, starting station information, terminal station information, next station information, or train position information, to the mobile information terminal. In the transmission and reception system according to the first embodiment, by performing encryption by taking advantage of differences in radio field intensity, it is possible to use a data area of transmission data only for the purpose of transmission of train information.

Further, by associating the radio field intensity output value and the encryption arithmetic process for the identification ID, it is possible to change the encryption arithmetic process each time transmission data is transmitted, thereby improving confidentiality of transmission data.

Further, by determining differences in radio field intensity in the mobile information terminal, it is possible to determine the common key required for decryption of transmission data, with a small amount of information.

In this embodiment, for simplicity of explanation, the vehicle has been described as a vehicle of a train; however, the vehicle is not limited to a train and may be a bus, a streetcar, or the like. Further, the same advantages can be obtained not only in vehicles but also in things, such as ships, used as transportation by multiple passengers, and in situations where users do not move frequently, for example, a situation where users are seated in seats in a facility, such as a movie theater or event site.

Modifications of the setting by the radio field intensity setter 151 will be described. FIGS. 8A and 8B are diagrams schematically illustrating change patterns of the radio field intensity set by the radio field intensity setter 151. The horizontal axes represent time, and the vertical axes represent the radio field intensity output value. FIG. 8A illustrates a first change pattern of the radio field intensity, and FIG. 8B illustrates a second change pattern of the radio field intensity.

In the first change pattern of the radio field intensity, four transmissions constitute a unitary change pattern, the radio field intensity output value increases in stages, and transmissions are performed at A1 dB, A2 dB, A3 dB, and A4 dB. Specifically, it is specified that the transmission at time $t_1$ ms be performed at A1 dB, the transmission at time $t_2$ ms be performed at A2 dB, the transmission at time $t_3$ ms be performed at A3 dB, and the transmission at time $t_4$ ms be performed at A4 dB; and the transmissions be performed at A1 dB, A2 dB, A3 dB, and A4 dB from time $t_5$ in a repeated manner.

In the second change pattern of the radio field intensity, four transmissions constitute a unitary change pattern, and it is specified that the transmission at time $t_1$ ms be performed at A4 dB, the transmission at time $t_2$ ms be performed at A1 dB, the transmission at time $t_3$ ms be performed at A3 dB, and the transmission at time $t_4$ ms be performed at A2 dB; and the transmissions be performed at A4 dB, A1 dB, A3 dB, and A2 dB from time $t_5$ in a repeated manner.

The radio field intensity output value A1 dB is associated with a first encryption process, the radio field intensity output value A2 dB is associated with a second encryption process, the radio field intensity output value A3 dB is associated with a third encryption process, and the radio field intensity output value A4 dB is associated with a fourth encryption process.

In a case where the correspondence between the four-stage setting values of radio field intensity output and the four kinds of encryption processes is predetermined in this manner, when four-stage radio field intensities are acquired on the reception device side, it is possible to determine one of the first to fourth encryption processes, from the radio field intensity information of received transmission data. Thus, the change pattern of the radio field intensity need not necessarily be a pattern in which the radio field intensity changes in stages.

Further, change patterns of the radio field intensity themselves may be associated with encryption processes.

FIG. 9 is a diagram illustrating correspondence between change patterns of the radio field intensity themselves and encryption processes. In change pattern 1, three transmissions constitute a unitary change pattern, and it is specified that the radio field intensity output value used for the first transmission be A1 dB, the radio field intensity output value used for the second transmission be A2 dB, and the radio field intensity output value used for the third transmission be A3 dB; and that change pattern 1 be associated with encryption process 1.

In a method that sets three-stage radio field intensity output values exclusively and performs the transmission three times in this manner, it is possible to set six kinds of change patterns and apply six kinds of encryption processes.

Further, in the above-described mobile information terminal 200, the radio field intensity measurer 221 measures and acquires the radio field intensity at which the radio receiver 210 receives transmission data. However, when transmission data has an area in which the radio field intensity output value on the transmission side is set, in addition to the data area, the radio field intensity acquisition unit 221 can acquire information on the radio field intensity of the transmission data by acquiring the radio field intensity output value stored in the transmission data. For example, in the BLE standard, transmission data has an area (16-bit length) that is different from the data area and in which the radio field intensity output value is set. The radio field intensity output value set by the radio field intensity setter 151 is stored in the area in which the radio field intensity output value is to be set. This method provides the advantage that the reception device side can make discrimination even if the radio transmission device side does not ensure the differences between the radio field intensities that can be discriminated on the reception device side, and the differences between the output values are small.

Second Embodiment

Figure 10:
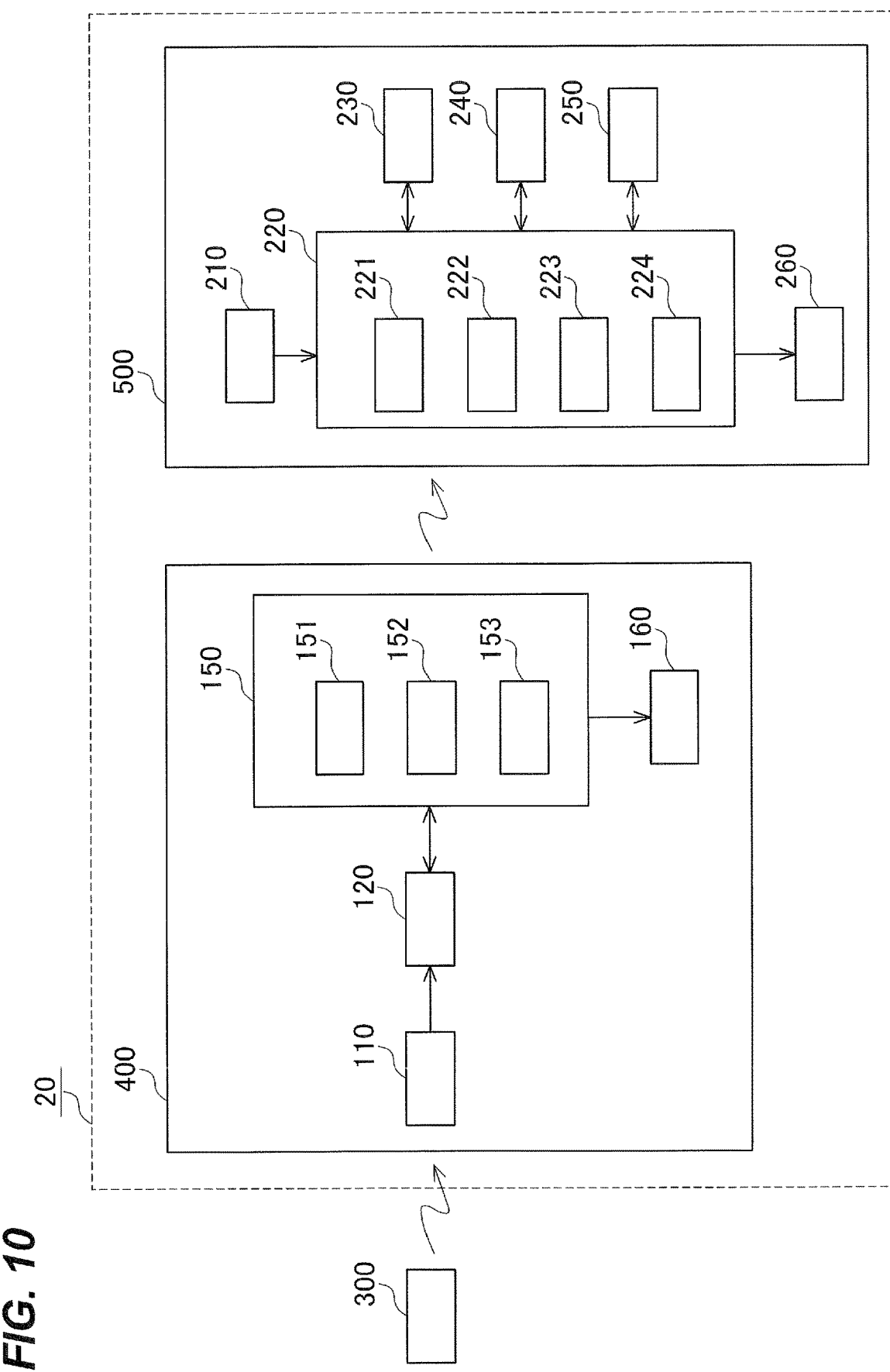
FIG. 10 is a block diagram schematically illustrating a configuration of a transmission and reception system according to a second embodiment of the present invention.

A transmission and reception system according to a second embodiment of the present invention will be described below. FIG. 10 is a block diagram schematically illustrating the transmission and reception system according to the second embodiment of the present invention. In FIG. 10, parts having the same functions as those in FIG. 1 are given the same reference characters, and detailed description thereof will be omitted here.

A radio transmission device 400 differs from that of the first embodiment in having an identification ID acquisition unit 153, and a mobile information terminal 500 differs from that of the first embodiment in having a content identification ID generator 224. For example, when a delay of the train occurs, it is necessary to include train information regarding delay information in transmission data in addition to a normal operation guide and broadcast the transmission data. At this time, the data capacity of the transmission data that is broadcast at a time may be insufficient. The transmission and reception system 20 makes it possible to transmit more information by dividing train information to be transmitted into multiple information items and then broadcasting multiple pieces of transmission data including the respective information items.

The radio transmission device 400 will be described first. The information acquisition unit 110 acquires, from the information transmitter 300, train information including detailed information, such as a vehicle number of the train, and information regarding a delay of the train, and sends the train information to the identification ID generator 120.

Although the function of the identification ID generator 120 is the same as that in the above first embodiment, the identification ID generator 120 may generate multiple identification IDs. For example, it can generate multiple identification IDs including an identification ID generated from information regarding operation of the train as a first identification ID and an identification ID generated from information regarding a delay of the train as a second identification ID, and store them at a time.

Next, the controller 150 sets a radio field intensity. The identification ID acquisition unit 153 acquires, from the identification ID generator 120, an identification ID to be encrypted. The acquired identification ID is determined using a second counter value that is different from the counter value used for the setting value of the radio field intensity and the encryption.

For example, when the second counter value is "1", the first identification ID is acquired; when the second counter value is "2", the second identification ID is acquired. Here, it is assumed that the second counter value in the second embodiment ranges from 1 to 4. Thus, the number of types of identification IDs that can be acquired from the identification ID generator 120 is four.

Figure 11:
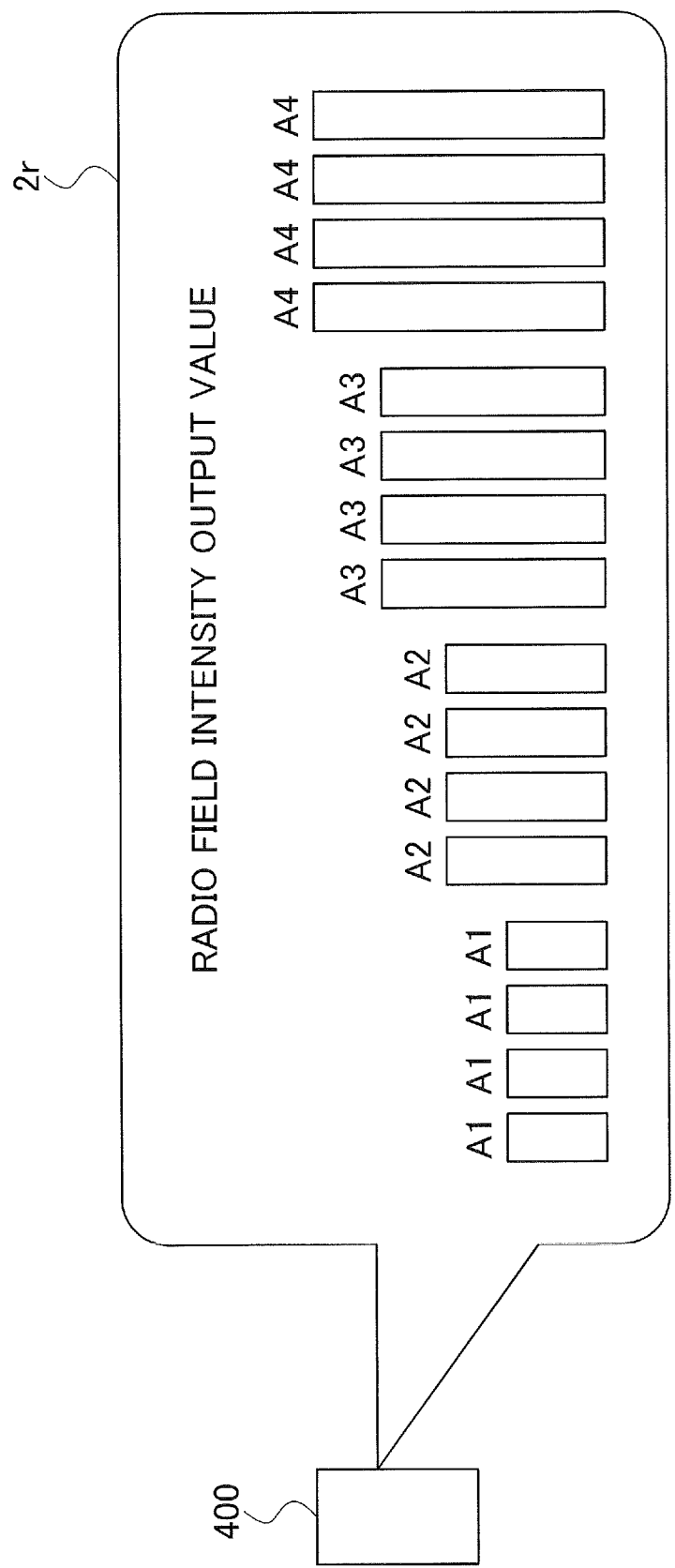
FIG. 11 is a schematic diagram illustrating radio field intensity output values in the transmission and reception system according to the second embodiment of the present invention.

Next, the encryptor 152 performs encryption, and the transmitter 160 performs broadcasting. FIG. 11 is a schematic diagram illustrating radio field intensity output values in the transmission and reception system according to the second embodiment of the present invention. This illustrates a case where there are four values for each of the radio field intensity output values, and all of the radio field intensity output values are indicated by 2r. In this embodiment, while first to fourth identification IDs are encrypted, the value of the output radio field intensity and the encryption arithmetic process are not changed. Thus, in the encryptor 152, the counter value is updated after the encryption process on the fourth identification ID is finished. However, the second counter value is incremented each time an identification ID is encrypted, in such a manner that the second counter value is incremented to "2" after the first identification ID is encrypted, and to "3" after the second identification ID is encrypted, and so on. When the second counter value is "4", it is reset to its initial value "1" instead of being incremented.

Figures 12, 13:
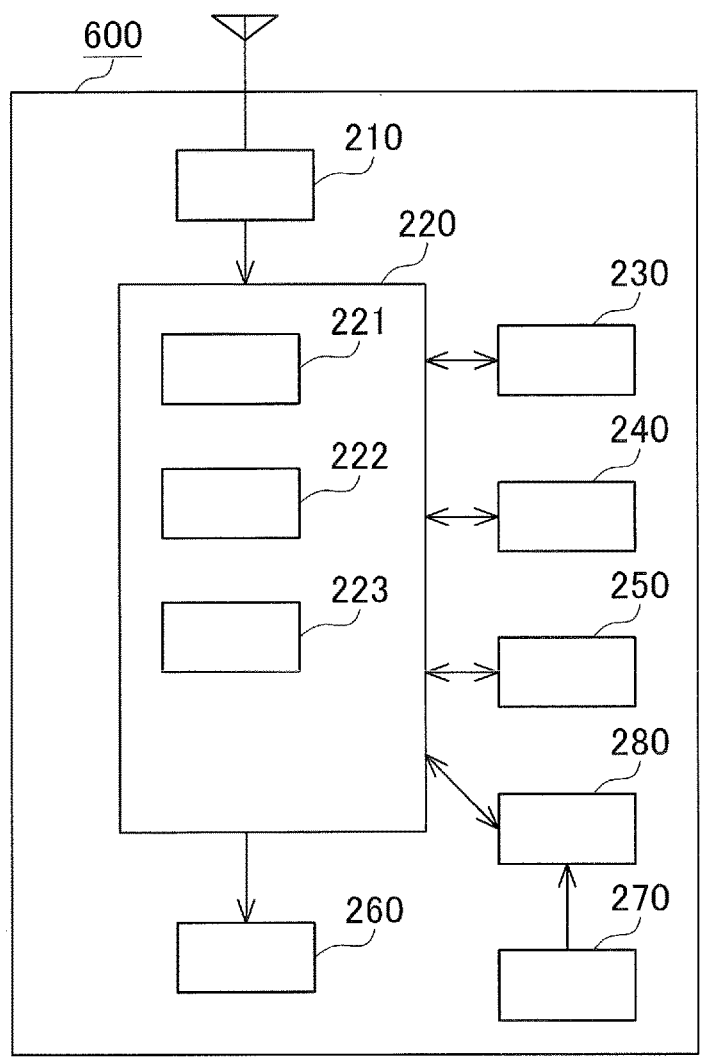
FIG. 12 is a schematic diagram of a content identification ID generation table of the transmission and reception system according to the second embodiment of the present invention.
FIG. 13 is a block diagram schematically illustrating a configuration of a mobile information terminal according to a third embodiment of the present invention.

The mobile information terminal 500 receives and decrypts transmission data, thereby extracting the identification ID. The content identification ID generator 224 accumulates identification IDs acquired by the decryptor 222, and generates a content identification ID from the accumulated identification IDs. FIG. 12 is a schematic diagram of a content identification ID generation table representing a correspondence relationship between the accumulated identification IDs and the content identification ID. The content identification ID is generated according to the correspondence relationship represented by the table.

The content information acquisition unit 223 acquires, from the content information manager 250, a content information item corresponding to the content identification ID, and the display unit 260 performs display on the basis of the content information item.

As described above, the transmission and reception system according to the second embodiment of the present invention makes it possible to transmit more information by dividing train information into multiple information items, including them in multiple pieces of transmission data, and broadcasting them. For example, it is possible to transmit, to the mobile information terminal, information that cannot be transmitted by only a single piece of transmission data, such as information regarding the arrival station or information regarding delay when a delay occurs, in addition to information regarding a normal operation guide.

Third Embodiment

A mobile information terminal according to a third embodiment of the present invention will be described. FIG. 13 is a block diagram schematically illustrating a configuration of the mobile information terminal according to the third embodiment of the present invention. In FIG. 13, parts having the same functions as those described in the above embodiments are given the same reference characters, and detailed description thereof will be omitted here. The mobile information terminal 600 differs from those of the above embodiments in having an input unit 270 that acquires input user information, and an input information memory 280 that stores the user information acquired by the input unit 270.

The mobile information terminal 600 receives input of user information, such as a language used by the passenger, who is the user, or designation of a station frequently used by the passenger, thereby providing an operation guide more appropriate for the passenger. For example, when the user's native language is English, the language for display of an operation guide can be changed to English. Also, by storing a getting-off station used by the passenger for commuting to and from work or school, or the like, in the input information memory 280, it is possible to take an action to prompt getting off to prevent missing the station when the train approaches the station, such as displaying or using sound.

The input unit 270 acquires the user information using an input interface of the mobile information terminal 600. For example, when the mobile information terminal 600 is a smartphone, the user information is input by operation of a touch panel. The user information may include the user's gender, age, getting-off station information, language, and the like.

The input of the user information by the user can be performed as needed. Each time user information is input, the input unit 270 acquires the user information.

The input information memory 280 stores the user information acquired by the input unit 270. The stored user information is updated each time the input unit 270 acquires the user information. When the content information acquisition unit 223 acquires the content information item, the stored user information is sent to the content information acquisition unit 223.

The content information acquisition unit 223 acquires the identification ID from the decryptor 222, and acquires the user information from the input information memory 280. The content information manager 250 previously stores content information items corresponding to the languages of different countries. The content information manager 250 sends a content information item to the content information acquisition unit 223 on the basis of the acquired identification ID and user information. The sent content information item is displayed as an image by the display unit 260.

For example, by establishing a network connection to a server having content items corresponding to different languages and acquiring them in advance, or by downloading a predetermined translation software program, it is possible to change the language used in the display screen. In this case, for example, when the language used by the user is "English", the user can change the language used in the display screen by inputting "English" as the language to be used through the input interface of the mobile information terminal 600. This language information can also be stored in the input information memory 280. The input of the user information can be performed inside and outside the vehicle. Also, when "station S3" is input as a getting-off station by the user and getting-off station information "station S3" is stored in the input information memory 280, if the acquired identification ID is information indicating "station S2", which is the station before "station S3", a content information item for prompting getting off is acquired from the content information manager 250. Alternatively, it is also possible, when the information indicating "station S2" is acquired, to display or inform by audio or buzzer sound that the next station is the getting-off station.

As described above, with the mobile information terminal according to the third embodiment of the present invention, by inputting the user information, it is possible to change the content displayed by the display unit 260 to a display screen corresponding to the individual user. For example, by changing the display language by using the user information, it is possible to display information in a language that is not used for display of an operation guide (or operation information) on a display installed in the vehicle. In the above description, the display unit 260 as an image output unit outputs an image, but it is also possible to employ an output unit that is also capable of audio output as the component 260, and perform audio output in a language that is not used for display of an operation guide on a display installed in the vehicle, thereby providing useful information that is easy for the user to understand.

REFERENCE SIGNS LIST 10, 20 transmission and reception system, 100, 400 radio transmission device, 110 information acquisition unit, 120 identification ID generator, 150 controller, 151 radio field intensity setter, 152 encryptor, 153 identification ID acquisition unit, 160 transmitter, 200, 500, 600 mobile information terminal, 210 radio receiver, 220 terminal controller, 221 radio field intensity measurer, 222 decryptor, 223 content information acquisition unit, 224 content identification ID generator, 230 radio field intensity memory, 240 common key memory, 250 content information manager, 260 display unit, 270 input unit, 280 input information memory, 300 information transmitter.

The invention claimed is:
1. A radio transmission device comprising:
an information acquisition unit to externally acquire information data;
an encryptor to encrypt the information data using one of a plurality of encryption processes used for encryption to generate transmission data, the plurality of encryption processes using different common keys;
a radio field intensity setter having a different setting for each of the plurality of encryption processes used for encryption, the radio field intensity setter setting a radio field intensity at which the transmission data is to be transmitted on the basis of which one of the plurality of encryption processes is used for encryption; and
a transmitter to transmit the transmission data at the set radio field intensity corresponding to the encryption process used for the encryption, thereby allowing a decryptor to determine, from among the different common keys, the common key used for the encryption on a basis of acquired radio field intensity information.

2. The radio transmission device of claim 1, wherein:
the radio field intensity setter has a setting value indicating a different radio field intensity for each of the plurality of encryption processes used for encryption in the encryptor, and
the encryption process is changed in an order in which the radio field intensity indicated by the setting value changes in stages.

3. The radio transmission device of claim 1, wherein the radio field intensity setter has change patterns, each change pattern representing a sequence of setting values of the radio field intensity for a predetermined number of transmissions of the radio transmission device and being associated with an encryption process used for encryption in the encryptor.

4. A reception device comprising:
a radio receiver to receive transmission data generated by encrypting information data using one of a plurality of encryption processes used for encryption and transmitted at a radio field intensity corresponding to the encryption process used for the encryption, the plurality of encryption processes using different common keys;
a radio field intensity acquisition unit to acquire radio field intensity information of the received transmission data; and
a decryptor to determine, from among the different common keys, the common key used for the encryption on a basis of the acquired radio field intensity information and decrypt the transmission data using the determined common key.

5. The reception device of claim 4, wherein the decryptor determines the common key on a basis of a change pattern of a radio field intensity acquired by the radio field intensity acquisition unit.

6. The reception device of claim 4, wherein the radio field intensity acquisition unit measures a radio field intensity at which the transmission data is received.

7. The reception device of claim 4, wherein:
the information data includes operation information, and
the reception device further comprises:
an input unit to acquire user information indicating a language used by a user; and
an output unit to output the operation information in the language used by the user on a basis of the user information and the decryption by the decryptor.

8. A transmission and reception system comprising:
a radio transmission device to generate transmission data from externally acquired information data and transmit the transmission data; and
a reception device to acquire the information data from the transmission data received from the radio transmission device, wherein:
the radio transmission device includes:
an information acquisition unit to acquire the information data;
an encryptor to encrypt the information data using one of a plurality of encryption processes used for encryption to generate transmission data, the plurality of encryption processes using different common keys;
a radio field intensity setter having a different setting for each of the plurality of encryption processes used for encryption, the radio field intensity setter setting a radio field intensity at which the transmission data is to be transmitted; and
a transmitter to transmit the transmission data at the set radio field intensity corresponding to the encryption process used for the encryption, and
the reception device includes:
a radio receiver to receive the transmission data;
a radio field intensity acquisition unit to acquire radio field intensity information of the received transmission data; and
a decryptor to determine, from among the different common keys, the common key used for the encryption on a basis of the acquired radio field intensity information and decrypt the transmission data using the determined common key.

9. The transmission and reception system of claim 8, wherein:
the information data indicates operation information of a vehicle in which the radio transmission device is provided,
the radio transmission device further includes an identification ID generator to generate an identification ID on a basis of the information data acquired by the information acquisition unit,
the encryptor encrypts the identification ID to generate the transmission data,
the decryptor decrypts the transmission data to acquire the identification ID, and
the reception device further includes:
a content information acquisition unit to acquire content information regarding the operation information on a basis of the identification ID acquired by the decryptor; and
an output unit to output the operation information on a basis of the content information acquired by the content information acquisition unit.

10. The transmission and reception system of claim 9, wherein:
the identification ID generator divides a data amount of the information data to generate a plurality of identification IDs, and
the content information acquisition unit acquires the content information regarding the operation information on a basis of the plurality of identification IDs acquired by the decryptor.

11. The transmission and reception system of claim 9, wherein:
the reception device further includes an input unit to acquire user information indicating a language used by a user,
the content information acquisition unit acquires, as the content information regarding the operation information, content information corresponding to the language used by the user on a basis of the user information, and
the output unit outputs the operation information in the language used by the user.

12. A transmission and reception method comprising:
externally acquiring information data;
encrypting the information data using one of a plurality of encryption processes used for encryption to generate transmission data, the plurality of encryption processes using different common keys;
setting a radio field intensity at which the transmission data is to be transmitted, the setting being different for each of the plurality of encryption processes used for encryption;
transmitting the transmission data at the set radio field intensity corresponding to the encryption process used for the encryption;

receiving the transmitted transmission data;
acquiring radio field intensity information of the received transmission data; and
determining, from among the different common keys, the common key used for the encryption on a basis of the acquired radio field intensity information and decrypting the received transmission data using the determined common key to acquire the information data.

13. The reception device of claim 5, wherein the radio field intensity acquisition unit measures a radio field intensity at which the transmission data is received.

14. The reception device of claim 5, wherein:
the information data includes operation information, and the reception device further comprises:
   an input unit to acquire user information indicating a language used by a user; and
   an output unit to output the operation information in the language used by the user on a basis of the user information and the decryption by the decryptor.

15. The reception device of claim 6, wherein:
the information data includes operation information, and the reception device further comprises:
   an input unit to acquire user information indicating a language used by a user; and
   an output unit to output the operation information in the language used by the user on a basis of the user information and the decryption by the decryptor.

16. The reception device of claim 13, wherein:
the information data includes operation information, and the reception device further comprises:
   an input unit to acquire user information indicating a language used by a user; and
   an output unit to output the operation information in the language used by the user on a basis of the user information and the decryption by the decryptor.

17. The radio transmission device of claim 1, wherein the encryptor changes the encryption process used for the encryption each time the transmission data is generated or each time the generation of the transmission data is performed a predetermined number of times, and uses the plurality of encryption processes in a predetermined order, and the radio field intensity at which the transmission data is transmitted changes in a pattern corresponding to the predetermined order.

18. The reception device of claim 4, wherein the encryption process used for the encryption is changed each time the transmission data is generated or each time the generation of the transmission data is performed a predetermined number of times, the plurality of encryption processes are used in a predetermined order, and the radio field intensity at which the transmission data is transmitted changes in a pattern corresponding to the predetermined order.

19. The transmission and reception system of claim 8, wherein the encryptor changes the encryption process used for the encryption each time the transmission data is generated or each time the generation of the transmission data is performed a predetermined number of times, and uses the plurality of encryption processes in a predetermined order, and the radio field intensity at which the transmission data is transmitted changes in a pattern corresponding to the predetermined order.

20. The transmission and reception method of claim 12, wherein the encrypting changes the encryption process used for the encryption each time the transmission data is generated or each time the generation of the transmission data is performed a predetermined number of times, and uses the plurality of encryption processes in a predetermined order, and the radio field intensity at which the transmission data is transmitted changes in a pattern corresponding to the predetermined order.

* * * * *